(12) United States Patent
Okazaki et al.

(10) Patent No.: US 6,909,990 B2
(45) Date of Patent: Jun. 21, 2005

(54) METHOD AND SYSTEM FOR DIAGNOSIS OF PLANT

(75) Inventors: Mitsuyoshi Okazaki, Tokorozawa (JP); Seiichi Asatsu, Zushi (JP); Shunzo Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 42 days.

(21) Appl. No.: 10/364,496

(22) Filed: Feb. 12, 2003

(65) Prior Publication Data

US 2003/0154051 A1 Aug. 14, 2003

(30) Foreign Application Priority Data

Feb. 13, 2002 (JP) .................................... P2002-036016

(51) Int. Cl.[7] .............................................. G06F 15/00
(52) U.S. Cl. ..................................... 702/183; 702/182
(58) Field of Search ........................ 700/96, 108, 110, 700/1, 95; 702/182, 183, 184, 185, 188

(56) References Cited

U.S. PATENT DOCUMENTS

| | | | | |
|---|---|---|---|---|
| 3,882,305 A | * | 5/1975 | Johnstone ................... 702/183 |
| 4,517,468 A | * | 5/1985 | Kemper et al. ............... 290/52 |
| 4,523,286 A | * | 6/1985 | Koga et al. .................. 702/183 |
| 4,628,435 A | * | 12/1986 | Tashiro et al. ................... 700/1 |
| 4,644,479 A | * | 2/1987 | Kemper et al. ............. 702/185 |
| 4,649,515 A | * | 3/1987 | Thompson et al. ............ 706/52 |
| 4,734,869 A | * | 3/1988 | Mickowski ................ 702/183 |
| 4,937,763 A | * | 6/1990 | Mott .......................... 702/183 |
| 4,951,234 A | * | 8/1990 | Bellows ..................... 702/183 |
| 4,985,857 A | * | 1/1991 | Bajpai et al. ................ 702/184 |
| 5,005,142 A | * | 4/1991 | Lipchak et al. ............. 702/183 |
| 5,067,099 A | * | 11/1991 | McCown et al. ........... 702/183 |
| 5,089,978 A | * | 2/1992 | Lipner et al. ............... 702/183 |
| 5,115,406 A | * | 5/1992 | Zatezalo et al. ............ 700/279 |
| 5,127,005 A | * | 6/1992 | Oda et al. ..................... 714/26 |
| 5,408,412 A | * | 4/1995 | Hogg et al. ................... 701/33 |
| 5,410,469 A | * | 4/1995 | Sakamoto et al. .............. 700/9 |
| 5,557,549 A | * | 9/1996 | Chang ........................ 702/183 |
| 5,608,657 A | * | 3/1997 | Conway et al. ............. 702/183 |
| 5,680,541 A | * | 10/1997 | Kurosu et al. ................ 714/26 |
| 5,884,243 A | * | 3/1999 | Taniguchi et al. .......... 702/183 |
| 6,014,612 A | * | 1/2000 | Larson et al. ............... 702/183 |
| 6,065,136 A | | 5/2000 | Kuwabara |
| 6,108,616 A | * | 8/2000 | Borchers et al. ............ 702/183 |
| 6,115,653 A | * | 9/2000 | Bergstrom et al. ............ 701/29 |
| 6,144,923 A | * | 11/2000 | Grosse ......................... 702/56 |
| 6,298,308 B1 | | 10/2001 | Reid et al. |
| 6,421,571 B1 | * | 7/2002 | Spriggs et al. ................ 700/17 |
| 6,556,950 B1 | * | 4/2003 | Schwenke et al. .......... 702/183 |
| 6,587,812 B1 | | 7/2003 | Takayama |
| 6,618,692 B2 | * | 9/2003 | Takahashi et al. .......... 702/188 |
| 2001/0056335 A1 | | 12/2001 | Ikeda et al. |
| 2003/0135349 A1 | * | 7/2003 | Yoshie et al. ............... 702/183 |

FOREIGN PATENT DOCUMENTS

| | | |
|---|---|---|
| JP | 2001-202457 | 7/2001 |
| JP | 2001-297179 | 10/2001 |
| WO | WO 00/62138 | 10/2000 |

* cited by examiner

*Primary Examiner*—Bryan Bui
*Assistant Examiner*—Douglas N Washburn
(74) *Attorney, Agent, or Firm*—Oblon, Spivak, McClelland, Maier & Neustadt, P.C.

(57) ABSTRACT

A plant diagnosis system friendly to a user (a plant-operating organization) for identifying an abnormality of an objective plant or machinery thereof, is provided. The plant diagnosis system includes a diagnoser's sub-system including a diagnosis computer and a terminal for a diagnosis expert and is connected via a network to a user's sub-system including a terminal for communicating with the diagnoser's sub-system. The plant diagnosis system provides a simple but repetitively available primary diagnosis and a detailed secondary diagnosis including the expert's judgement, which are selectively available on the user's initiative. The diagnosis computer receives a diagnosis request and plant state variables of the plant or machinery and executes the primary diagnosis and a part of the secondary diagnosis based on the plant state valuables.

14 Claims, 8 Drawing Sheets

| 44 | | |
|---|---|---|
| PLANT UNIT : XX POWER STATION, NO. 1 TURBINE 45 | | 46 |
| No. | CHECK ITEMS | ITEMS TO BE MARKED FOR SELECTION |
| 1 | TIME OF OCCURRENCE OF PROBLEMATIC VIBRATION | |
| | | ○ (1) DURING A REVOLUTION CHANGE<br>◉ (2) : |
| 2 | REPRODUCIBILITY OF VIBRATION CHANGE ※ ···· | |
| | | ◉ (1) OCCURS FREQUENTLY<br>○ (2) : |
| 3 | PERIOD AFTER INSPECTION OF VIBRATION CHANGE | |
| | PREVIOUS INSPECTION : [ ]<br>(SPECIFY AS : 1998-05-16) | ○ (1) WITHIN 3 MONTHS<br>○ (2) : |
| 4 | CHARATCTER OF CHANGE WITH TIME (LONG SPAN) | |
| | TIME OF FIRST OCCURRENCE : [ ]<br>(SPECIFY AS : 2001-07-17) | ○ (1) OCCURRED NOW FOR THE FIRST TIME<br>○ (2) : |
| 5 | VIBRATION CHANGE ON A CHART | |
| | 5-1 MODE OF CHANGE ON A CHART(1) | ◉ (1) CHANGE<br>○ (2) : |
| | 8-2 TYPE OF VIBRATION METER | ◉ (1) ON SHAFT<br>○ (2) : |
| 9 | TURBINE TYPE | |
| | | ·600MW ·LNG ·TC4F-33.5" ·246atg ·538/538C |
| 10 | REMARKS ※ ···· | |
| | | [ ] |

43 — | SUMMARY DIAGNOSIS | | < BACK |

| PLANT UNIT : XX POWER STATION, NO. 1 TURBINE  45 | 48 |
|---|---|
| No. | CHECK ITEMS | ANSWERS |
| 1 | TIME OF OCCURRENCE OF PROBLEMATIC VIBRATION | (2) DURING AN OPERATION AT (NORMAL) RATED SPEED AND LOAD |
| 2 | PRESENCE OR ABSENCE OF REPRODUCIBILITY OF VIBRATION CHANGE | (1) OCCURS FREQUENTLY |
| 3 | PERIOD AFTER INSPECTION OF VIBRATION CHANGE | (4) DURING AN OPERATION FOR ROUTINE INSPECTION TIME OF PREVIOUS ROUTINE INSPECTION FINISHED: |
| 4 | CHARACTER OF CHANGE WITH TIME (LONG SPAN) | (4) THE CHANGE HAS OCCURRED SINCE A ROUTINE INSPECTION TIME OF OCCURRENCE:2001-10-11 |
| 5 | VIBRATION CHANGE ON A CHART<br>5-1 MODE OF CHANGE ON A CHART (1) :<br>5-2 MODE OF CHANGE ON A CHART (2) :<br>5-3 AMPLITUDE OF VIBRATION CHANGE : | (1) CHANGE<br>(1) REPTITION OF PULSATIVE CHANGES<br>(2) MEDIUM (>2~5/100mmp-p)<br>AMPLITUDE OF CHANGE:2.00 |
| 6 | BEARING CONCERNED WITH VIBRATION CHANGE<br>BEARING CONCERNED | FIRST BEARING, SECOND BEARING |

DIAGNOSIS RESULTS — 49       ▓▓:RELEVANCE:HIGH  ░░:RELEVANCE:MEDIUM

| NO. | FACTORS | EVALUATION |
|---|---|---|
| 1. | RESIDUAL IMBALANCE | |
| 2. | SCATTERING OR FALLING OF ROTATING PARTS | |
| 3. | CENTER DEVIATION OF COUPLING (DURING OPERATION) | |
| 4. | CENTER DEVIATION OF COUPLING (COUPLING OPERATION AND ECHONOMICAL CHANGE) | |
| 5. | PERMANENT BEND OF ROTOR | |
| 6. | ATTACHMENT OF CONTAMINATION ON ROTATING MEMBER | |
| 7. | RUBBING (ORDINARY) | |
| 8. | RUBBING (CARBONIZING) | |
| 9. | HEAVY RUBBING (WATER INDUCTION) | |
| 10. | THERMAL CHANGE OF TURBIN ROTOR | ░░░░ |
| 11. | PRIMARY BEND OF ROTOR | |
| 12. | TORQUE IMBALANCE | |

AS A RESULT OF SUMMARY DIAGNOSIS,
THERE ARE POSSIBILITIES OF FACTORS
INDICATED BY BARS IN THE COLUMN OF EVALUATION.

FOR MORE DETAILED DIAGNOSIS,
PLEASE CLICK THE BUTTON.

51 — [ APPLY FOR DETAILED DIAGNOSIS ]      [ < BACK ] — 50

| No. | CHECK ITEMS | SELECTION ITEMS |
|---|---|---|
| 1 | TIME OF OCCURRENCE OF PROBLEMATIC VIBRATION | |
| | | ○ (1) DURING CHANGE IN REVOLUTION CONDITIONS<br>◉ (2) : |
| 2 | PRESENCE OR ABSENCE OF REPRODUCIBILITY OF VIBRATION CHANGE ※ ···· | |
| | | ◉ (1) OCCURS FREQUENTLY<br>○ (2) : |
| 11 | VIBRATION PHASE CHANGE | |
| | 11-1 VIBRATION PHASE AT THE TIME OF VIBRATION CHANGE<br>(VIBRATION CHANGE OCCURRED AT A RATED SPEED) | ☐ (1) IN-SPAN BEARING PHASE CHANGE:150-180°<br>(DYNAMIC)<br>☐ (2) : |
| | 11-2 DIRECTION OF CONTINUAL VIBRATION PHASE CHANGE | ○ (1) REVOLUTION CONTINUOUSLY BECOMING SLOWER WITH TIME<br>○ (2) : |
| 12 | VIBRATION FREQUENCY ※ ···· | |
| | 12-1 REVOLUTION SYNCHRONIZED/NON-SYNCHRONIZED | ○ (1) REVOLUTION SYNCHRONIZED<br>○ (2) REVOLUTION NON-SYNCHRONIZED |
| | 12-2 IN CASE OF REVOLUTION NON-SYNCHRONIZED | ○ (1) AGREEING WITH DANGEROUS ROTOR SPEED |
| 18 | ECS ISSUE HISTORY OF THIS PLANT UNIT (ONLY WITH RESPECT TO VIBRATION) | |
| 19 | REMARKS ※ ···· | |

PLANT UNIT : XX POWER STATION, NO. 1 TURBINE
ABNORMAL VIBRATION :

[ CONFIRM DATA ]  [ < BACK ]

FIG. 6

METHOD AND SYSTEM FOR DIAGNOSIS OF PLANT

FIELD OF THE INVENTION AND RELATED ART

The present invention relates to a method and a system for diagnosis of a plant, i.e., an apparatus or apparatus system for carrying on an industrial business, or machinery organizing the plant, as an object of diagnosis, by receiving variables representing such an objective plant or plant machinery.

Various types of plants, inclusive of a steam power plant, an atomic energy power plant, a combined cycle power plant, a chemical plant and a steel production plant, are equipped with their own plant diagnosis system including various sensors for detecting physical state variables (plant state(—representing) variables), such as a temperature, a pressure, a flow rate and vibration data during operation of the plant, and a diagnosis computer (i.e., a computer for diagnosis) receiving the detected plant state variables to diagnose the objective plant or plant machinery with respect to the presence or absence of abnormality or identifying the nature of the abnormality.

A conventional plant diagnosis system 1 is organized as shown in FIG. 7, wherein a plant user's unit(or system) 5 equipped with a diagnosis computer 4 and a plurality of terminals 4 (only one being shown) is disposed on the side of a plant system 2, such as a steam power plant, so that such a user's unit 5 including a diagnosis computer 3 and a terminal 4 is provided for each of various plants. Each terminal 4 is equipped with a monitor 4a and a keyboard 4b.

On the other hand, the plant system 2 includes plant machinery 6 composed of apparatus or equipments, pipes, etc., organizing, e.g., a steam power plant, and various plant state variables such as pressures, temperatures, flow rates and vibration data from the machinery 6 are detected by respective sensors 7 and inputted to a plant data-collecting and -processing computer 8. The computer 8 operates necessary data processing on the inputted plant state variables and supplies the processed plant state variables necessary for diagnosis to the diagnosis computer 3.

In such a plant diagnosis system 1, the plant state variables of the plant machinery 6 in a steam power plant, etc., are detected by various sensors, and the detected plant state variables are inputted to the plant data collecting and processing computer 8 and periodically subjected to necessary data processing.

The processed data from the computer 8 is taken in the diagnosis computer 3, and plant diagnosis is performed based on the inputted processed data by the diagnosis computer 3 so as to judge whether the plant state is normal or abnormal and identify the abnormality, if any, whereby the diagnosis results are displayed on the monitor 4a of the terminal.

Thus, a conventional plant diagnosis system is so organized that a user's unit 5 for each plant system 2 is provided with a diagnosis computer 3 and a terminal 4 therefor, and the diagnosis computer 3 is supplied with plant state variables from a plant data collecting and processing computer 8 in the plant system 2, so that the diagnosis computer 3 operates plant diagnosis as to whether the plant state is normal or abnormal and what the nature of the abnormality is, if any, and the results are displayed on a monitor 4a of the terminal 4.

Generally, in such a plant diagnosis system 1, a plant data collecting and processing computer 8 and sensors 7 are necessarily provided and are ordinarily operated in order to check the state of plant machinery and monitor the operation, but a diagnosis computer 3 is not ordinarily used unless a particular abnormality requiring diagnosis occurs.

Japanese Laid-Open Patent Application (JP-A) 2001-202457 and JP-A 2001-297179 have made proposals regarding such plant diagnosis method and system, so as to allow a quick and reliable technical support for such plant diagnosis of plant machinery, etc, by using a tele-communication network. The plant diagnosis method and system according to the former proposal, allows a display of flag so as to stimulate a consideration of monitoring by human intervention.

In the above plant diagnosis method and system disclosed in JP-A 2001-202457 and JP-A 2001-297179, stagewise classification into primary diagnosis and secondary diagnosis of plant machinery is not taught or suggested so as to allow secondary diagnosis on user's initiative. The two JP publications also fail to teach repetitive plant diagnosis (primary diagnosis) by a user for monitoring plant machinery in a steam power plant, etc., while confirming diagnostic responses, or receipt of repetitive diagnostic responses from a diagnosis organization or unit for allowing such repetitive (primary) plant diagnosis by a user. Further, the publications also fail to disclose a plant diagnosis system convenient or friendly to a user (organization) (i.e., a plant operating organization or company) so as to allow the user such repetitive plant diagnosis which can be conveniently relied on by the user on the user's initiative without hesitation and without a limit in number of plant diagnosis.

Further, a plant diagnosis system 1 including a user's unit 5 equipped with a diagnosis computer 3 and a terminal 4 thereof is required to incorporate in the user's unit system one diagnostic algorithm for each abnormal phenomenon, and this requires the addition of a function and operation therefor in the system, such as a diagnosis computer 3, of the user's unit 5 on each occurrence of new abnormal phenomenon.

It is generally impossible to incorporate, in such a plant diagnosis system, various diagnostic algorithm corresponding to possibly occurring abnormal phenomenon in prediction thereof at the time of installation of the system. The maintenance operation, such as addition and change of functions, has to be performed by a consultant or an operator moving to the system concerned of the user organization. Moreover, the maintenance operation of a diagnosis computer 3 is rather complicated and time-consuming regardless of a low frequency of use of the diagnosis computer 3. This results in an increase in running cost of the entire plant system including such a diagnosis system 1.

Further, for a conventional plant diagnosis system, there can occur a new abnormal phenomenon which does not allow the diagnosis system to identify the nature of the abnormality of plant machinery. In such a situation, it becomes necessary for the user to ask for detailed diagnosis and counteraction for the abnormality to a diagnoser organization, such as a plant maker or a consultant company. In case where such an order is not convenient, the user can possibly hesitate the order, and such a situation can be expected that a substantial time lapses until an actual order to result in a serious plant condition before the action of the diagnoser organization.

In the case of requiring an urgent plant diagnosis, the plant diagnosis has to be performed in the presence at the plant of a plurality of experts from such a diagnoser organization, so that the diagnosis cost is liable to be expensive relative to the actual operation.

SUMMARY OF THE INVENTION

In view of the above-mentioned circumstances, an object of the present invention is to provide a so-called "user-friendly" diagnosis method and system which allows an immediate plant diagnosis response, a repetitive self-diagnosis by a user on its initiative, and an economization of plant diagnosis cost.

Another object of the present invention is to provide a user-friendly plant diagnosis method and system which allows a user to judge the necessity of a secondary diagnosis on the user's initiative.

A further object of the present invention is to provide a plant diagnosis method and system which unnecessitates a diagnosis computer or a terminal thereof in a user organization to allow a reduction in initial cost and/or maintenance cost of an entire plant system.

Another object of the present invention is to provide a plant diagnosis method and system which provides a user organization with a larger latitude of plant system designing and also with various plant diagnosis services, which are accurate, of high added value and can be quickly available from a diagnoser organization.

Still another object of the present invention is to provide a flexible and highly reliable plant diagnosis method and system which allows an on-line primary diagnosis, and a secondary diagnosis that is available by switching from the primary diagnosis and performed while relying on a plant diagnosis expert via a tele-communication network, thus allowing intensive, accurate and quickly reliable plant diagnosis.

According to the present invention, there is provided a plant diagnosis method, comprising steps to be executed by a diagnosis computer in a diagnoser's unit, including: a step of accepting a primary diagnosis request inputted from a terminal in a user's unit, a step of executing a primary diagnosis of an objective plant or machinery thereof based on plant data of the objective plant or machinery thereof, on accepting the primary diagnosis request, and a step of transmitting a result of the primary diagnosis to the terminal in the user's unit; wherein the primary diagnosis is provided so as to allow a repetition of the primary diagnosis request from the terminal in the user's unit.

In an embodiment, the plant diagnosis method, further comprises steps to be executed by the diagnosis computer in the diagnoser's unit, including: a step of accepting a secondary diagnosis request inputted from the terminal in the user's unit having received the primary diagnosis result, a step of accepting the secondary diagnosis request and a step of notifying an expert at the diagnoser's unit of the secondary diagnosis request, a step of accepting data collected by the expert, and a step of executing a secondary diagnosis of the objective plant or machinery thereof based on the data collected by the expert to prepare a result of the secondary diagnosis.

In another embodiment, the plant diagnosis method comprises: a step of transmitting the secondary diagnosis result prepared by the secondary diagnosis to a terminal for the expert to have the expert make a final judgment, and a step of transmitting an answer of the secondary diagnosis result based on the expert's final judgment to the terminal in the user's unit directly or via the diagnosis computer through a network.

In a further embodiment of the plant diagnosis method, the plant data or the data collected by the expert is obtained from a plant data-collecting and -processing computer storing state variables of the objective plant or machinery thereof.

According to another aspect, the present invention provides a plant diagnosis system, comprising a diagnoser's unit including: means for accepting a primary diagnosis request inputted from a terminal in a user's unit via a network, means for accepting the primary diagnosis request and executing a primary diagnosis of an objective plant or machinery thereof based on plant data of the objective plant or machinery thereof, and means for transmitting the primary diagnosis result to the terminal in the user's unit, wherein the primary diagnosis is provided so as to allow a repetition of the primary diagnosis request from the terminal in the user's unit.

In another embodiment, the plant diagnosis system further includes: means for accepting a secondary diagnosis request inputted from the terminal in the user's unit having received primary diagnosis result, means for accepting the secondary diagnosis request and notifying an expert at a diagnoser's unit of the secondary diagnosis request, means for accepting data collected by the expert, and means for exercising a secondary diagnosis of the objective plant or machinery thereof based on the data collected by the expert.

In another embodiment, the plant diagnosis system further includes: means for transmitting the secondary diagnosis result to a terminal for the expert to have the expert make a final judgment, and means for transmitting an answer of the secondary diagnosis result based on the expert's final judgment to the terminal in the user's unit via a network.

In still another embodiment of the plant diagnosis system, the plant data or data collected by the expert is obtained from a plant data-collecting and -processing computer storing state variables of the objective plant or machinery thereof.

In another embodiment, the plant diagnosis system further includes means for presenting abnormalities having occurred in the past at the objective plant or machinery thereof.

In a further embodiment of the plant diagnosis system, the terminal in the diagnoser's unit is connected to the terminal in the user's unit so as to allow people at the terminals have a TV conference including an interrogatory process while commonly viewing an identical picture on monitors of the respective terminals by utilizing a TV conference support system.

In a further embodiment, the plant diagnosis system further includes means for counting the number of primary or/and secondary diagnosis, time of system utilization, or diagnosis time.

In a further embodiment, the plant diagnosis system further includes means for calculating service charges based on a result of the counting.

According to still another aspect, the present invention provides a plant diagnosis system, including: a diagnoser's sub-system, a user's sub-system and a network connecting the diagnoser's sub-system and the user's sub-system; said user's sub-system comprising a terminal for communication with the diagnoser's system via the network, said diagnoser's sub-system comprising a diagnosis computer and a terminal for an expert;

wherein said diagnosis computer comprises: means for accepting a primary diagnosis request inputted from the terminal in the user's sub-system via the network, means for accepting the primary diagnosis request and executing a primary diagnosis of an objective plant or machinery thereof based on plant data of the objective plant or machinery thereof, and means for transmitting the primary diagnosis result to the terminal in the user's sub-system; and the primary diagnosis is provided so as to allow a repetition of the primary diagnosis request from the terminal in the user's sub-system.

In an embodiment of the plant diagnosis system, the diagnosis computer further includes: means for accepting a secondary diagnosis request inputted from the terminal in the user's unit having received primary diagnosis result means for accepting the secondary diagnosis request and notifying an expert at a diagnoser's unit of the secondary diagnosis request, means for accepting data collected by the expert, and means for exercising a secondary diagnosis of the objective plant or machinery thereof based on the data collected by the expert.

BRIEF DESCRIPTION OF THE DRAWINGS

FIG. 4 illustrates an example of display window for inputting primary diagnosis data according to a plant diagnosis system of the invention.

FIG. 5 illustrates a display picture showing an example of primary diagnosis results according to a plant diagnosis system of the invention.

FIG. 6 illustrates an example of display window for inputting secondary diagnosis data according to a plant diagnosis system of the invention.

DESCRIPTION OF PREFERRED EMBODIMENTS

Figure 1:
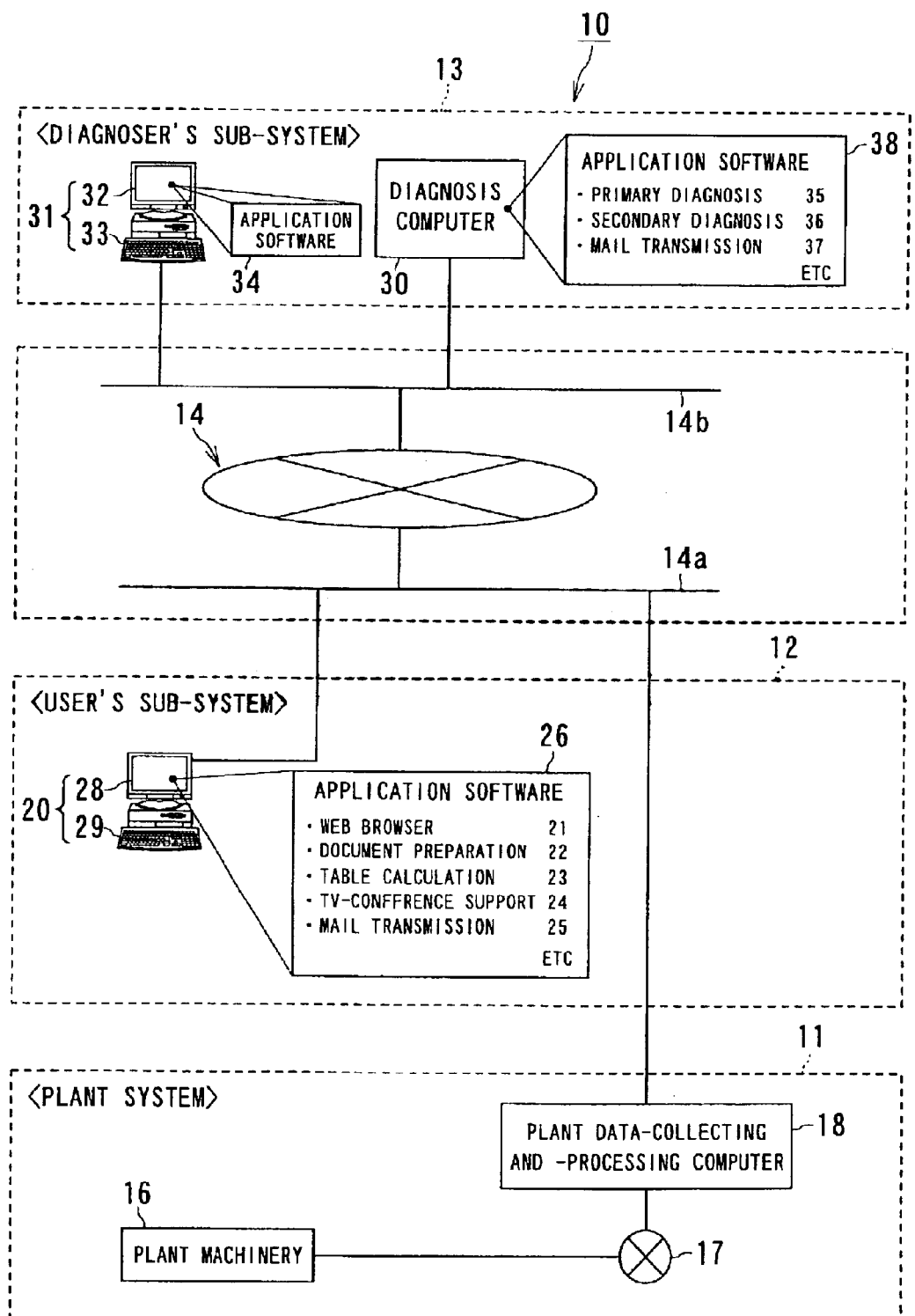
FIG. 1 is a block diagram illustrating an embodiment of the plant diagnosis system according to the invention.

FIG. 1 is a block diagram illustrating an embodiment of the plant diagnosis system according to the present invention. Referring to FIG. 1, there is illustrated a plant diagnosis system 10 for judging the presence or absence of abnormality and identifying the nature of abnormality, if any, of a plant of various types, inclusive of various power plants, such as a steam power plant and an atomic power plant, a chemical process plant, and a steel production plant, by inputting various state variables of the plant for performing the judgment.

The plant diagnosis system 10 includes a user's unit (or sub-system) 12 disposed on the side of a plant system 11, such as a steam power plant, and a diagnoser's unit (or sub-system) 13 disposed in a diagnoser organization, such as a plant maker or a consultant company, which are connected via the (tele-)communication network 14 (including a principally user's side line 14a and a principally diagnoser's side line 14b) so as to allow exchange of various data and service information necessary for plant diagnosis between the user's unit 12 and the diagnoser's unit 13.

The plant system 11 includes a diagnosis object plant, such as a steam power plant, which in turn includes a large number of pieces of plant machinery 16 organizing the patent, and each item of the plant machinery is provided with sensors 17 for detecting plant state (—representing) variables (physical state variables), such as temperature, flow rate and vibration data necessary for the plant diagnosis. The outputs (i.e., plant state variables) from the respective sensors 17 are inputted to a plant data-collecting and -processing computer 18, where the plant state variables are collected and processed into a form appropriate for transfer to the diagnoser's unit 13.

The plant data collecting and processing computer 18 need not be necessarily installed in the site of the plant system 11 but can be placed at other places, e.g., in (parallel with) the user's unit 12 or the diagnoser's unit 13, provided that it is connected to the network 14. If the computer is installed in (parallel) with the diagnoser's unit 13 within the diagnoser organization, the load and expenses regarding the repairment, program change and maintenance of the computer can be minimized on the user (i.e., plant operating organization).

To the plant data collecting and processing computer 18 annexed to the plant system 11, a single or a plurality of (personal) computer 20 of general purpose-type (hereinafter, sometimes referred to as a "terminal computer 20") as the user's side terminal is connected via the (tele-communication) network 14a. The computer 20 may be provided, by installation therein, with various application software 26 including a web browser 21, and also other software, such as office document preparation software 22, table calculation software 23, TV-conference system-supporting software 24, and mail-transmission software 25. Each computer 20 may be provided with a monitor 28 and a keyboard 29.

On the other hand, the plant data collecting and processing computer 18 is connected to a diagnosis computer (i.e., a computer used for diagnosis) 30 and a (personal) computer 31 of general purpose-type, respectively, in a diagnoser's unit (or sub-system) 13 via the (tele-communication) network 14. The computer 18 may also be connected to the (personal) computer 20 in the user's unit 12 via the network 14a. The diagnosis computer 30 is connected to a single or plurality of (personal) computer 31 of general purpose-type (hereinafter sometimes referred to as a "terminal computer 31") as the diagnoser's side terminal via the (tele-communication) network 14b, and is also connected to the terminal computer 20 in the user's unit 12 via the tele-communication network 14.

The diagnosis computer 30 is composed of a single computer or a plurality of computers. In the latter case, the plural computers may be separately in charge of different functions, such as transmission, diagnosis and data storage, respectively, or different plants, e.g., disposed in parallel. The terminal computer 31 may also be equipped with a monitor 32 and a keyboard 33.

The terminal computer 31 is provided for use by a (diagnosis) expert performing a secondary diagnosis of the diagnosis objective plant and plant machinery thereof. The terminal computer(s) 31 need not be always disposed at the same location as the diagnosis computer 30 and can be also disposed at plural locations if disposed in a plurality. In other words, the terminal computer(s) 31 can be disposed at or in arbitrary region(s) provided that if they are connected to the network 14, and such a flexible disposition of the terminal computer(s) 31 may allow an increased latitude in regional distribution of experts.

The terminal computer 20 in the user's unit 12 and the terminal computer 31 in the diagnoser's unit 13 respectively function as a terminal of the diagnosis computer 30. The terminal computer 31 in the diagnoser's unit 13 may have similar functions with the terminal computer 20 in the user's unit 12 and may be provided with various types of application software by installation therein. Each of the terminal computers 20 and 31 may assume any form of communication devices, inclusive of mobile communication devices, such as portable terminals, PDAs and wireless mobile devices, instead of (personal) computers of general purpose-type, as far as they can be connected to communication networks (or lines) 14a and 14b.

By installing such a diagnosis computer 30 in a diagnoser's unit (or sub-system) 13 of a diagnoser organization, it becomes unnecessary to dispose such a diagnosis computer or a terminal thereof in a user's unit (or sub-system) 13 of a user organization as in the conventional plant diagnosis system, thereby allowing decreases in plant operation costs, such as system introduction cost and system maintenance cost. The user's unit 14 disposed on the side of a plant system 11 is required to be provided with only a terminal computer 20, so that the user's unit 12 of plant diagnosis system can be simplified, and the latitude of apparatus or equipment installation in the user's entire plant system and also in the entire plant diagnosis system is increased.

The diagnosis computer 30 in the diagnoser's unit 13 is used to receive plant state variables of the plant to be diagnosed or machinery organizaing the plant, thereby effecting plant diagnosis, i.e., judging whether the plant state is normal or abnormal and identifying the nature or cause of abnormality, if any, based on the received (i.e., inputted) plant state variables. For this purpose, the plant data collecting and processing computer 18 supplies plant state variables collected from the plant machinery 16 themselves and/or processed data obtained therefrom by operation of the computer 18 to the diagnosis computer 30 via the (tele-communication) network 14.

The diagnosis computer is provided with various functions of software 38, inclusive of primary diagnosis software 35 tailored for respective plants, such as steam power plants, as diagnosis object, and/or various types or models of plant machinery 16 constituting the objective plant, a secondary diagnosis software 36, and a mail transmission software 37, installed therein.

An expert or a group of experts specialized in a plant concerned among various plants inclusive of steam power plants are engaged with the diagnoser's unit, and the expert or the group of experts are allowed to make an access to the diagnosis computer 30 via the terminal computer 31 (or a computer or terminal for their personal use (not shown)).

[Primary Plant Diagnosis]

Figure 2:
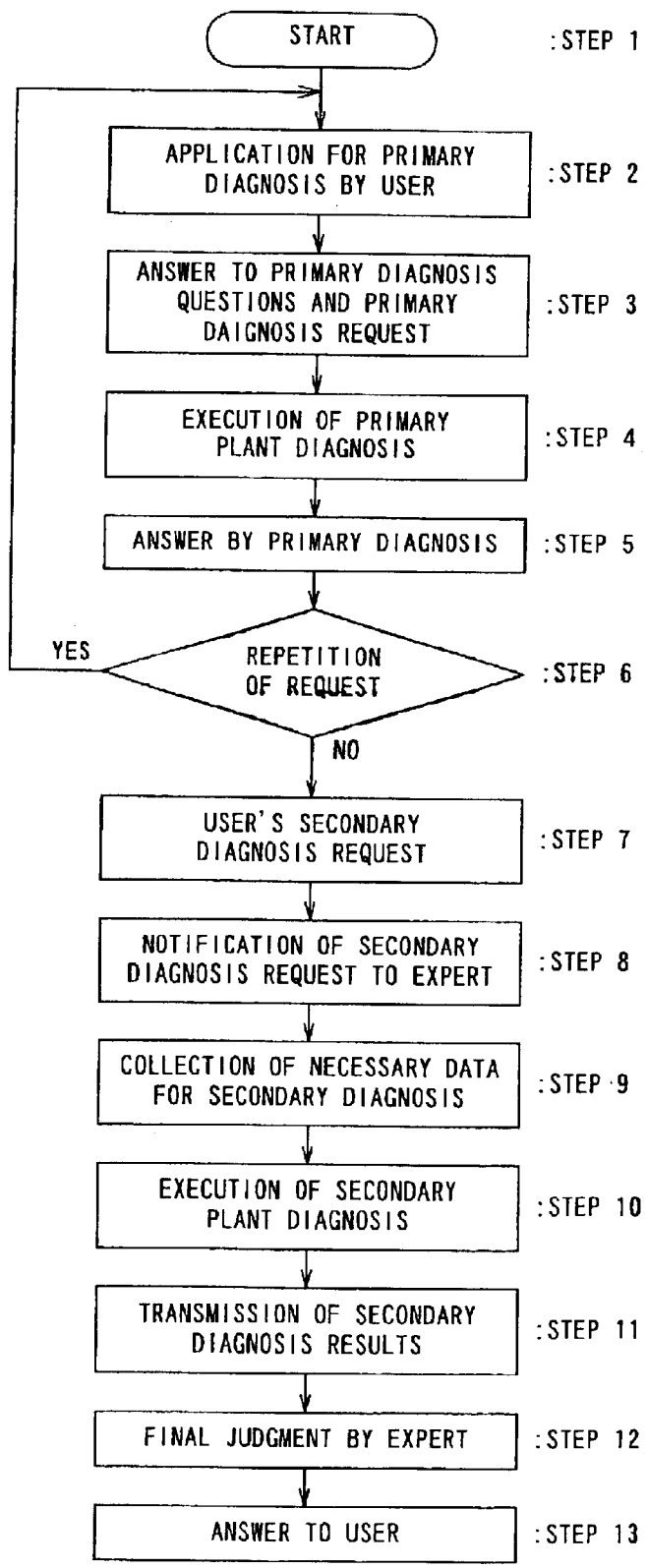
FIG. 2 is a flow chart showing a sequence of diagnosis steps according to an embodiment of the plant diagnosis of the present invention.

The plant diagnosis system 10 described so far with reference to FIG. 1 may be operated along a sequence as shown in FIG. 2. Referring to these figures, a terminal computer 20 in the user's unit 12 is turned on to start a web browser 21 (step 1), and an internet address (URL) is inputted or selected, e.g., by manipulation of a keyboard 29 so as to communicate with the diagnosis computer 30 in the diagnoser's unit 13. As a result, the terminal computer 20 in the user's unit 12 is allowed to communicate with the diagnosis computer 30 in the diagnoser's unit 13 via the (tele-communication) network 14 and apply for a diagnosis to the diagnosis computer 30 (step 2).

Thus, the web browser 21 installed in the terminal computer 20 allows the connection of the terminal computer 20 via the network 14 only by inputting or selecting an internet address (URL), e.g., by manipulation of the keyboard 29.

Figure 3:
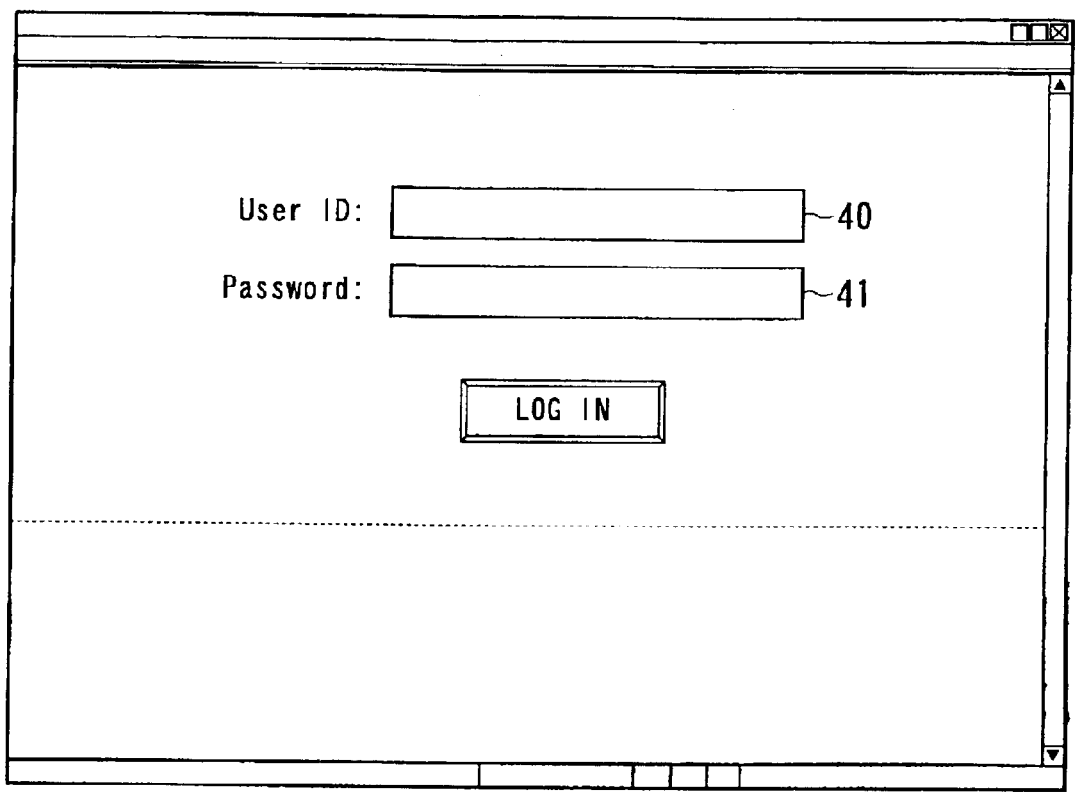
FIG. 3 illustrates an example of display window (screen) for inputting a user personal ID and a password to a personal computer disposed in a user organization according to a plant diagnosis system of the invention.
Figure 7:
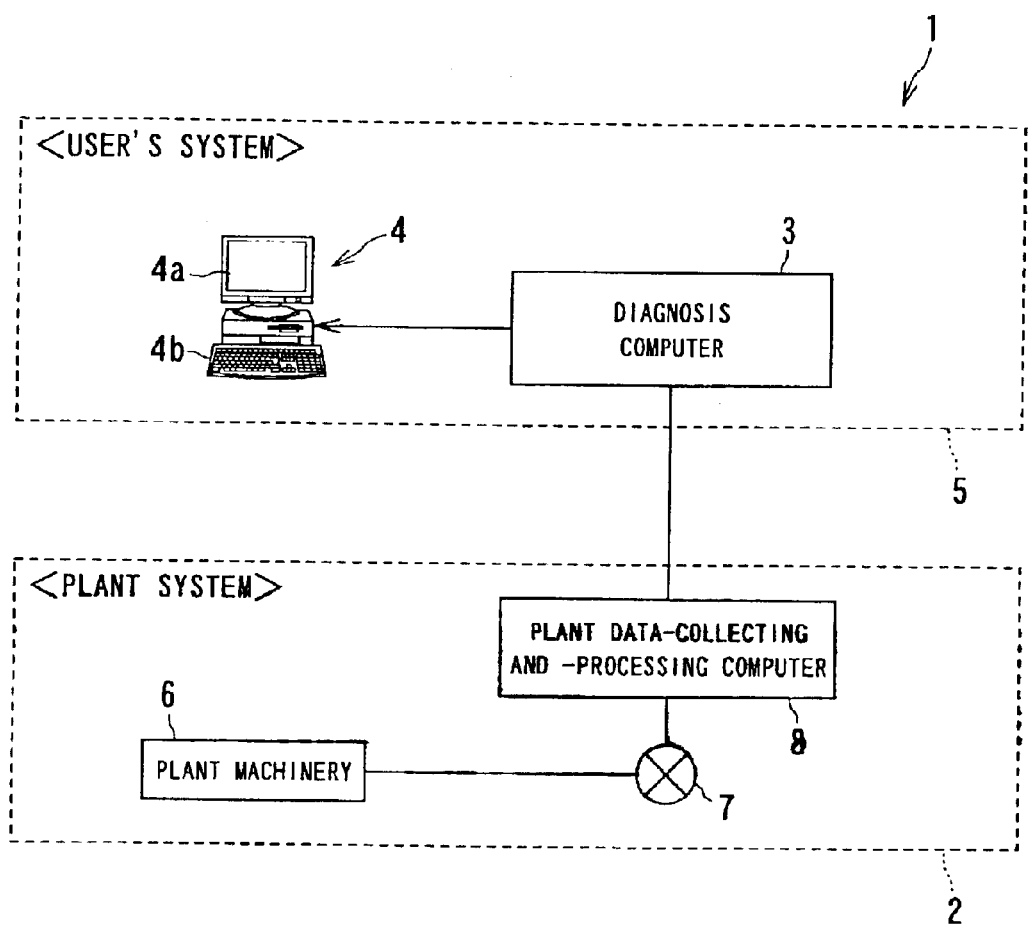
FIG. 7 is a block diagram illustrating a conventional plant diagnosis system.

When the web browser is started and the correct address (URL) is inputted by manipulation of the keyboard 29, the selected terminal computer 20 puts forward a display window as shown in FIG. 3 for inputting user's ID data, such as a user ID 40 and a password 41 identifying the user unit 12 or a user individual in charge of the plant diagnosis, and by transmitting such ID data to the diagnosis computer 30, the terminal computer 20 is allowed to accede to basic data associated with a pliant to be diagnosed (a diagnosis object plant) among variouw plants for (preliminary) application for plant diagnosis(primary diagnosis).

When the (preliminary) application for primary diagnosis from the terminal computer 20 is accepted by the diagnosis computer 30, the diagnosis computer 30 prepares acception data for each diagnosis application and sends to the user's terminal computer 20 a primary diagnosis menu window 44 as shown in FIG. 4 for displaying a check sheet 45 including primary diagnosis questionnaire data included in the primary diagnosis software 35. A plurality of check sheets are provided for selection of a relevant one by the user directly or on selection based on response to simple questions put forward by the diagnosis computer 30. If a relevant check sheet 45 is displayed, the user is urged to input necessary data for the primary diagnosis by selection from a plurality of alternative items 46. Certain data, when necessary, may be manually inputted by the user or automatically sampled from the plant data collecting and processing computer 18. In the case of the sampling from the computer 18, the data insertion on the check sheet 45 can also be made by a simple manipulation on the associated window by the user instead of the automatic data insertion by the computer 18 or 30.

The questionnaire for primary diagnosis is prepared in advance for each piece of plant machinery of a diagnosis object plant so as to include, e.g., about 10 check items 45. In case where the plant machinery 16 to be diagnosed is, e.g., a No. 1 turbine in a ... XX ... power station, a primary diagnosis check sheet for vibration diagnosis may include check items 45 as shown in FIG. 4 and reproduced below together with some details of items 46 to be marked for selection by the user.

1. TIME OF OCCURRENCE OF PROBLEMATIC VIBRATION
   ○ (1) During change in revolution conditions
   ◉ (2) During an operation at (normal) rated speed and load.
   ○ (3) During an increase in revolution speed and a change in load.
   ○ Not specifiable or unknown at present.
2. PRESENCE OR ABSENCE OF REPRODUCIBILITY OF VIBRATION CHANGE (* In case of no restoration after an abrupt change, the reproducibility of vibration data after a subsequent start-stopping)
   ◉ (1) Occurs frequently.
   ○ (2) Occurs occasionally.
   ○ (3) Not occurred thereafter.
   ○ Not specifiable or unknown at present.
3. PERIOD AFTER INSPECTION OF THE TIME OF VIBRATION CHANGE
   ○ (1) Within 3 months after a routine inspection.
   ○ (2) After 3 months and before 1 year after a routine inspection.
   ○ (3) After 1 year after a routine inspection.
   ◉ (4) During an operation for routine inspection.
   ○ Not specifiable or unknown at present.
4. CHARACTER OF CHANGE WITH TIME (LONG-SPAN)
   ○ (1) Occurred now for the first time (except for immediately after a routine inspection).
   ○ (2) The change has become noticeable since a certain time.

○ (3) The change occurred at a certain time and has been stably observed.
◎ (4) The change has occurred since a routine inspection.
○ (5) An identical change occurred in the past.
○ (6) The change occurs at a repetition of start and stop.
○ Not specifiable or unknown at present.
5. VIBRATION CHANGE ON A CHART * In the case of a revolution-dependent vibration increase during an increasing revolution, select "Change at a high level".
5-1: Mode of change on a chart(1)
◎ (1) Change.
○ (2) Change at a high level.
○ (3) Change with time.
○ Not specifiable or unknown at present.
8-2 TYPE OF VIBRATION METER
◎ (1) On shaft.
○ (2) On pedestal.
○ (3) Non-contact vibration meter.
9. TURBINE TYPE
600 MW·LNG·TC4F–33.5·246 atg·538/538C
10. REMARKS * Please fill in, if any.

The check items 45 are prepared in advance by the primary diagnosis software 35 in the diagnosis computer 30 and installed therein.

If the user answers to question items on the primary diagnosis questionnaire menu window 44 displayed on the monitor 28 of the terminal computer 20 by mark selection and data input by manipulation of the keyboard 29 and clicks a diagnosis execution button 43, a primary diagnosis request is made and the selected answers and input data for the respective question items are sent to the diagnosis computer 30 via the (tele-communication) network 14.

At the stage when the selected answers and inputted data are inputted to the diagnosis computer 30, a primary diagnosis is performed based on a diagnosis request from the terminal computer 20 (Step 4, FIG. 2).

For example, the diagnosis computer 30 runs the primary diagnosis software 35 based on the selected answers and inputs data from the terminal computer 20 to effect a primary diagnosis, and quickly sends the results of the diagnosis as a primary diagnosis answer back to the terminal computer 20. A primary diagnosis answer window 47 is displayed for example as shown in FIG. 5 on the monitor 28 of the terminal computer 20. Incidentally, even if the selected answer and inputted data from the terminal computer 20 is not complete, the diagnosis computer 30 quickly performs a primary diagnosis corresponding to the supplied data.

The primary diagnosis is performed by the diagnosis computer 30 in the following manner, for example, for predicting the cause of an abnormal vibration. A matrix calculation is performed by taking check item factors representing vibration characteristics and operation process states on the abscissa to calculate probability of causal factors of the vibration for each causal factor. A plurality of such calculation results are combined to estimate composite probabilities and find out a causal factor indicating a high probability.

More specifically, a calculation formula is provided for each predicted causal factor to calculate a weighted sum of respective answers to respective check items on the check sheet 45, and if the diagnosis execution button 43 is clicked, an estimated probability is calculated for each causal factor and reflected in the length of a bar graph (shown in FIG. 5).

In the embodiment represented by the check sheet 45 in FIG. 4, the probability for Factor 10 of Thermal change of turbine rotor (FIG. 5), for example, is calculated based on the answers on the check sheet 415 according to the following formula;

Probability (Factor 10)=Item 1(Answer 1*2.0+Answer 2*3.0+Answer 3*1.5)+Item 2(Answer 1*1.0+Answer 2*2.5+Answer 3*4.0)+- - -.

The above calculation is performed for each causal factor.

The primary diagnosis results replied to the terminal computer 20 are displayed in a primary diagnosis answer window 47. The window 47 displays, e.g., the check items 45 and the user's answered items 48 in the primary diagnosis check sheet for vibration, and diagnosis result display items 49 on the monitor 28 of the terminal computer 20. The diagnosis result display item 49 include a column of FACTORS and a column of EVALUATION displayed side by side on the monitor screen. The displayed items in the primary diagnosis answer window 47 are reproduced hereinbelow:

PLANT UNIT: XX POWER STATION, No. 1 TURBINE
NO. CHECK ITEMS 45 (ANSWERS 48)
 1. TIME OF OCCURRENCE OF PROBLEMATIC VIBRATION
   ((2) During an operation at (normal) rated speed and load.)
 2. PRESENCE OR ABSENCE OF REPRODUCIBILITY OF VIBRATION CHANGE
   ((1) Occurs frequently)
 3. PERIOD AFTER INSPECTION OF VIBRATION CHANGE
   ((4) During an operation for routine inspection. Time of previous routine inspection finished:)
 4. CHARACTER OF CHANGE WITH TIME(LONG SPAN)
   ((4) The change has occurred since a routine inspection. Time of occurrence: 2001-10-11)
 5. VIBRATION CHANGE ON CHART
   5-1 Mode of change on a chart (1):
     ((1) Change.)
   5-2 Mode of change on a chart (2):
     ((7) Repetition of pulsative changes.)
   5-3 Amplitude of vibration change
     ((2) Medium(>2~5/100 mmp-p) Amplitude of change: 2.06)
 6. BEARING CONCERNED WITH VIBRATION CHANGE
   Bearing concerned (First bearing, Second bearing.)
   Rotor type ((2) HIP)
   coupling type
   6-1 Single or plural ((2) Plural bearings (two or more parts))
   6-2 Bearing concerned with noticeable vibration change.
     ((1) Both bearings of a single rotor are noticeable)
DIAGNOSIS RESULTS 49
FACTORS EVALUATION
 1. Residual imbalance.
 2. Scattering or falling of rotating parts.
 3. Center deviation of coupling (during operation).
 4. Center deviation of coupling (coupling operation and economical change).
 5. Permanent bend of rotor.
 6. Attachment of contamination to rotating member.
 7. Rubbing (ordinary).
 8. Rubbing (carbonizing).
 9. Heavy rubbing (water induction).

10. Thermal change of turbine rotor.
11. Primary bend of rotor.
12. Torque imbalance.
13. Condition change of bearing support.
14. Rotor cracking.
15. Backlash of bearing supports.
16. Random vibration due to excitation of steam flow.

In the case where the selected answers and input data are not sufficient for identifying the factors of abnormality and specific parts of abnormality, a plurality of possible factors together with evaluation of the relevance thereof as shown in FIG. 5 are replied to the terminal computer 20 (Step 5).

In this instance, the user can repeat a request for primary diagnosis with respect to the abnormality under different conditions by clicking a "<BACK" button 50. More specifically, by clicking "<BACK" button 50, it becomes possible to return to the primary diagnosis questionnaire menu window 44 (FIG. 4) so as to prepare input data and resends them to the diagnosis computer 30, whereby a selective determination of abnormality factors can be quickly performed. As a result, even if there is no man power like experts in the user organization having the user's unit 12, the user can quickly obtain a primary diagnosis answer and repeat the primary diagnosis to its satisfaction by trial and error while confirming the primary diagnosis answer, according to the user's consideration(Step 6).

Thus, the plant primary diagnosis provides a quick diagnosis answer and allows a user to repeat the diagnosis by itself. Accordingly, there is no need for the user to hesitate a plant diagnosis and can conveniently request a plant primary diagnosis on its initiative. Primary diagnosis results are quickly sent back, so that the user can operate the objective plant and its machinery while confirming the diagnosis results. Accordingly, it is possible to effectively prevent the abnormality from developing to a serious state during the operation of the objective plant.

The terminal computer 20 can easily get an access to diagnosis results of typical abnormalities having occurred in the past and stored in the diagnosis computer 30. By referring to the stored data of typical abnormalities, the user can easily compare the diagnosis results of the objective plant or machinery thereof under consideration for a primary diagnosis with the diagnosis results of similar abnormalities, to make a judgement.

The user utilizing the user's unit (or subsystem) can identify the cause and factors of the abnormality from the primary diagnosis results and can end the diagnosis according to its judgement if it is satisfied with the diagnosis results.

[Secondary Plant Diagnosis]

The plant diagnosis system 10 or the diagnoser's unit (sub-system) 13 thereof provides for secondary diagnosis facilities which are friendly or convenient to users. For example, for a case where a plurality of causes and/or factors of an abnormality are replied, thereby making it difficult for the user to selectively determine one of them, or the user wishes to know more details about a countermeasure or steps to be taken against the causes or factors determined by the diagnosis, the primary diagnosis result display window 47 provides for a request button 51 for a detailed diagnosis (secondary diagnosis), and when the button is clicked by the user, a secondary diagnosis request function is initiated to send a secondary diagnosis request to the diagnoser's unit (or sub-system) 13. (Step 7)

The plant secondary diagnosis is requested by the user based on its own judgement in the case where the user is not satisfied with the primary diagnosis results or wishes to have more detailed secondary diagnosis results. The request can be effected by the user's keyboard manipulation or selective clicking of the secondary diagnosis application button 51. The diagnosis computer 30 is equipped with a secondary diagnosis request-receiving function.

Having received the secondary diagnosis request, the diagnosis computer 30 operates a mail transmission transceiving software 37 installed therein to send a e-mail reporting a receipt of the secondary diagnosis request to a terminal computer 31 associated with a relevant expert in the diagnoser's unit, thereby notifying the expert of the secondary diagnosis request. (Step 8)

By using the terminal computer 31, a particular person, such as the expert, in charge of the secondary diagnosis, accedes to the diagnosis computer 30 after confirming the contents of the request to refer to the primary plant diagnosis results. The person in charge of the secondary diagnosis accedes to the diagnosis computer 18 in order to refer to plant data from the plant data collecting and processing computer 30, and runs the secondary diagnosis software 36 to obtain secondary diagnosis results and store them in the diagnosis computer.

More specifically, the person in charge, automatically or manually, accedes to the plant data including source data from the plant data collecting and processing computer 18 and the primary diagnosis results in the diagnosis computer 30 via the terminal computer 31, to acquire necessary data for secondary diagnosis. On the other hand, the person in charge of the secondary diagnosis also contacts a relevant person in the user organization having the user's unit 12, to make a hearing via on-line or wireless communication facilities, such as facsimile, telephone or e-mail, to collect necessary data for secondary diagnosis. (Step 9)

For collecting the necessary data for secondary diagnosis, the secondary diagnosis software 36 installed in the diagnosis computer 30 is provided with a variety of secondary diagnosis questionnaire menu window data 55, e.g., as shown in FIG. 6 which are provided and stored in the diagnosis computer 30 respectively for a variety of types and models of diagnosis object plant or plant machinery thereof. Each secondary diagnosis questionnaire menu window data 55 includes more detailed items of questions necessary for secondary plant diagnosis. The questions in the secondary diagnosis questionnaire menu window 55 are designed to be answered by the expert in charge of the secondary diagnosis in the diagnoser organization having the diagnoser's unit 13 based on the collected data.

The contents of the secondary diagnosis questionnaire menu window 55 shown in FIG. 6 are reproduced below.
PLANT UNIT: XX POWER STATION, No. 1 TURBINE
ABNORMAL VABRATION:
NO. CHECK ITEMS SELECTION ITEMS
1. TIME OF OCCURRENCE OF PROBLEMATIC VIBRATION ○ (1) During a change in revolution conditions.

◉ (2) During an operation at (normal) rated speed and load.

○ (3) During an increase in revolution speed and a change in load.

○ Not specifiable or unknown at present.

2. PRESENCE OR ABSENCE OF REPRODUCIBILITY OF VIBRATION CHANGE (* In case of no restoration after an abrupt change, the reproducibility of vibration data after a subsequent start-stopping)

◉ (1) Occurs frequently.

○ (2) Occurs occasionally.

○ (3) Not occurred thereafter.

○ Not specifiable or unknown at present.

11. VIBRATION PHASE CHANGE 11-1 Vibration phase change at the time of vibration change (Vibration change occurred at a rated speed.) (Two items selectable.)

☐ (1) In-span bearing phase change: 150–180° (dynamic)

☐ (2) In-span bearing phase change: ≦90° (static)

☐ (3) In-span bearing phase change: 120–150°

☐ (4) In-span bearing phase change: 90–120°

11-2 Direction of continual vibration phase change

○ (1) Revolution continuously becoming slower with time.

○ (2) Revolution continuously becoming faster with time.

○ (3) Vibration change sector changing in one direction.

○ Not specifiable or unknown at present.

12. VIBRATION FREQUENCY * In case of no fluctuation on a chart, input "revolution synchronized" first.

12-1 Revolution synchronized/non-synchronized.

○ (1) Revolution synchronized.

○ (1) Revolution non-synchronized.

12-2 In case of revolution non-synchronized

○ (1) Agreeing with dangerous rotor speed.

18. ECS ISSUE HISTORY OF THIS PLANT UNIT (Only with respect to vibration)

19. REMARKS * Fill in, if any.

The answers to the questions and inputted data in the secondary diagnosis questionnaire menu window 55 are inputted to the diagnosis computer 30, and a secondary diagnosis is effected by running the secondary diagnosis software 36 installed in the diagnosis computer 30. (Step 10)

To describe some details of the secondary analysis for a vibration abnormality, for example, the computer 30 makes a quantitative analysis for a vibration cause presumed by the primary diagnosis to increase the accuracy of the presumptive analysis. For this purpose, the computer 30 is provided with shaft vibration analyzing models for typical vibration abnormality phenomena, such as an imbalanced vibration position presumption, a (contact) rubbing position presumption, a rotor bend presumption and an unstable vibration characteristic for each plant.

Figure 8:
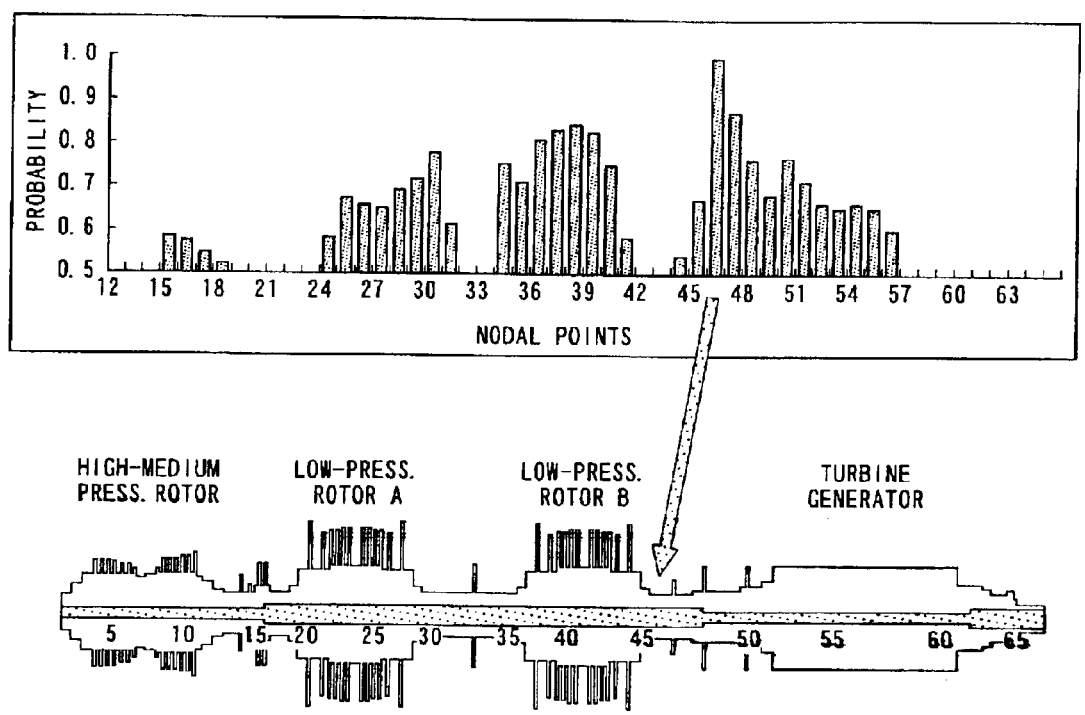
FIG. 8 illustrates an example of secondary diagnosis output for an abnormal vibration.

FIG. 8, for example, illustrates an example of secondary diagnosis output for an abnormal vibration, which has been presumed to be possibly caused by rubbing by the primary diagnosis, to determine the position of the rubbing along the length of the rotor shaft based on the analysis of the vibration data. More specifically, FIG. 8 indicates the occurrence of rubbing around the generator-side bearings of the low-pressure turbine rotor B including an upper graph showing the probability of the location (nodal point) of rubbing based on the shaft bend response and a lower illustration of rotor arrangement along the nodal points.

The secondary diagnosis results by the diagnosis computer 30 are once sent to the terminal computer 31 associated with the expert via the communication line 14b, and displayed on the monitor 32 of the terminal computer 31. (Step 11)

The secondary plant diagnosis results obtained by the diagnosis computer 30 and transmitted to and displayed on the monitor of the terminal computer 31 in the diagnoser's unit 13 are examined by the expert and finally judged to identify the abnormal parts of the objective plant and specify the nature of the abnormality. (Step 12)

The person in charge operating the terminal computer 31 is an expert or a group of experts. The person in charge performs a secondary diagnosis, i.e., an overall judgement by evaluating the primary diagnosis results and the plant data from the diagnosis computer 30, and the hearing data, to derive secondary diagnosis results, which are then compared with the secondary diagnosis results from the diagnosis computer 30 by the expert or group of experts to make a final judgement of secondary diagnosis. A part of the above-mentioned operation of the expert(s), such as manipulation of the keyboard 33 of the terminal computer 31, may be assigned to a secretary to the expert(s).

If the secondary diagnosis results by the expert(s) are judged to be correct, the secondary diagnosis results are registered as secondary diagnosis answer data so as to be recognizable by the terminal computer 20 in the user's unit 12. It is also possible to prepare secondary diagnosis answer documents or data by using a memory medium, such as a floppy disk or a magneto-optical disk, and send them by another transmission system, facsimile or postal mail, etc., and/or to display such secondary diagnosis answer data on the monitor 28 of the terminal computer 20 in the user's unit by using the document preparation software 22 and the table calculation software 23.

The secondary diagnosis answer by the expert(s) may also be made by inputting to a regular form window provided in the diagnosis computer 30 in addition to the secondary diagnosis results obtained by the diagnosis computer 30 in Step 10.

It is also possible to use the TV conference system support software 24, etc., installed in the terminal computer 31 of the diagnoser's unit 13 and the terminal computer 20 of the user's unit, thereby displaying identical pictures or windows on the monitors 32 and 28 of the terminal computers 31 and 20, respectively, to explain the displayed secondary diagnosis answer data to the person in charge at the user's unit 12.

Thus the second plant diagnosis answer is transmitted to the user. (Step 12)

In case where the expert in charge is not satisfied with the secondary diagnosis results automatically prepared by the diagnosis computer 30 in Step 10, it is also possible to make an optimum answer including the identification of the cause and factors of the abnormality and a countermeasure through a consultation of a group of experts including the expert in charge. The thus-prepared secondary diagnosis answer may be stored in the diagnosis computer 30 and transmitted to the user in a similar manner as in the case where the secondary diagnosis answer is prepared along the automatically prepared secondary diagnosis results.

After transmitting the secondary diagnosis answer, the person in charge at the diagnoser's unit 13 registers data necessary for calculating a service charge covering the time and services including the primary and secondary diagnosis utilizing the diagnosis computer 30, by also utilizing the diagnosis computer 30.

More specifically, the diagnosis computer 30 is equipped with a counter means for calculating the service charge based on the stored primary and secondary diagnoses results data and a calculation means for calculating the service charges for each user ID or for each terminal computer 20 in the user's unit 12. The service charge may be calculated based on factors selected from the number of accession, number of diagnosis, time of system utilization and time of consideration by the expert(s) of each user organization or a combination of these.

The diagnosis computer 30 may also be equipped with a calculation means for discounting at the time of calculating the amount of service charge for each user ID or for each terminal computer 20 or each user's unit 12. It is also possible to adopt a scheme of subtracting the service charge from a preliminary deposited account of each user determined in advance by a contract.

Further, in the plant diagnosis system 10 for diagnosing the presence or absence of abnormality and the nature of the abnormality in various plants, such as a steam power plant, in the case where a new type of abnormality is discovered, the primary diagnosis software 35 and the secondary diagnosis software 36 installed in the diagnosis computer 30 may be revised (version-up). The revision and re-installation of the application softwares 38 including the diagnosis softwares 35 and 36 may be easily performed in the diagnosis computer 30 of the diagnoser's unit 13.

An example of secondary diagnosis answer to a user may be in a form, such as "A trouble was found with respect to the first-stage turbine blades, so that you are recommended to open the turbine casing for inspection."

Next, the function of the primary diagnosis system is supplemented hereinbelow.

As shown in FIGS. 1 and 2, the primary diagnosis system 10 unnecessitates the installation of a diagnosis computer and a terminal thereof in the user's unit 12, and classifies a primary diagnosis work into a primary diagnosis which is a relatively simple plant diagnosis for specification or selective listing of possible locations and nature of abnormalities, and a secondary diagnosis requiring an expert's judgement, so that the primary diagnosis request can be made repetitively and freely without hesitation and without restriction in number of the requests by a user on its initiative, and each primary diagnosis request can ben immediately answered to on an on-line basis.

Further, in the case where the location of abnormality is not determined by the primary diagnosis answer or user is not satisfied therewith, the user can obtain a more detailed plant diagnosis on its demand by requesting a secondary diagnosis including an expert's judgement of an expert or a group of experts, whereby a highly reliable plant diagnosis system can be established.

In the plant diagnosis system 10, the primary diagnosis of an objective plant or plant machinery 16 thereof is designed to provide an answer thereof instantaneously and without restriction in number of diagnosis requests, so that the user does not hesitate to request such a simple primary diagnosis but can repeat the primary diagnosis request at a low cost, whereas in the case where the selective determination of the location and nature of abnormality by the primary diagnosis answer is insufficient and the answer is not satisfactory or sufficient to the user, the user can request a secondary diagnosis on its initiative for more detailed secondary diagnosis data.

Thus, in the plant diagnosis system 10, in the case where the primary diagnosis of an objective plant or plant machinery 16 thereof fails in determination of the location of abnormality and identification of the nature of the abnormality due to insufficiency of basic data for the primary diagnosis, the user can request a secondary diagnosis including an expert's judgement, thus allowing a selective use of the primary diagnosis and the secondary diagnosis which are classified according to their contents.

In the plant diagnosis system 10, the terminal computer 20 of each user unit is turned on and operated to run the web browser 21 installed in the terminal computer 20. Then, if an address (URL) for acceding to the diagnosis computer 30 in the diagnoser's unit 13 is inputted, the terminal computer 20 is placed in a state where it is communicatable with the diagnosis computer 30. Then, a window (as shown in FIG. 3) for inputting an ID 40 and a password 41 of a user individual is displayed on the monitor 28 of the terminal computer 20 by transmission from the diagnosis computer 30.

Next, the user (i.e., a diagnosis requester) at the user's unit 12 fills in the user ID 40 and password 41 and clicks the log-in button. The diagnosis computer 30 compares the inputted user ID 40 and password 41 with the data base registered in advance, and if they agree to each other, displays a plant selection window on the terminal computer 20. The user selects an objective plant to be diagnosed and one or more items of plant machinery 16 thereof from the plant selection window, and clicks a new request button, if it is the case, to send an application for primary diagnosis request to the diagnosis computer 30.

On receiving the application for primary diagnosis request, the diagnosis computer 30 prepares a new primary diagnosis data window for the objective plant or plant machinery 16 thereof (as shown in FIG. 4) together with an allotted diagnosis number and transmit the window to the terminal computer 20 concerned. The primary diagnosis questionnaire menu window 44 lists several question items for obtaining basic data necessary for the primary diagnosis, and the question items are to be answered by selection of items or filling-in of plant state data (FIG. 4).

On receiving the primary diagnosis questionnaire menu window 44 displayed on the monitor 28 thereof, the terminal computer 20 in the user's unit 12 (the diagnosis requester's unit) waits for the user's inputting the basic data for the primary diagnosis. The user (diagnosis requester) inputs the answers to the selection-type questions and the filling-in-type questions by manipulation of the keyboard 29, etc., of the terminal computer 20, and clicks the diagnosis request button 43 for transmitting the inputted data to request a primary diagnosis. In this instance, the transmission can be effected even if all the questions are not answered.

On receiving the primary diagnosis request including the answers to the questionnaire, the diagnosis computer 30 runs the primary diagnosis software 35 and transfers the received answers to the questionnaire to the primary diagnosis software 35, thereby initiating the primary diagnosis. The thus-prepared primary diagnosis results are registered to a data base site corresponding to the allotted diagnosis number, and a primary diagnosis answer window or result window 47 (as shown in FIG. 5) is prepared based on the primary diagnosis results and transmitted to the terminal computer 20 having made the request.

On receiving the primary diagnosis result window 40 as shown in FIG. 5, the terminal computer 20 of the diagnosis requester displays the window 47 on its monitor 28 to wait for the diagnosis requester's reaction. The diagnosis requester can request a primary diagnosis again by clicking the "<BACK" button 50 to recover the primary diagnosis questionnaire menu 44 (FIG. 4) and changing the answers to the primary diagnosis questionnaire, or can end the primary diagnosis to finish the utilization of the primary diagnosis system 10 by clicking the closing button at the upper right corner on the result window 47, if it is satisfied with the primary diagnosis results.

Alternatively, it is also possible to apply for a secondary diagnosis to the diagnosis computer 30 by clicking a secondary diagnosis request button 51 based on the primary diagnosis results.

On receiving the secondary diagnosis request, the diagnosis computer 30 executes a secondary diagnosis request-receiving function of automatically transmitting reply data to the effect that the secondary diagnosis request has been received to the terminal computer 20 having applied for the secondary diagnosis. The diagnosis computer 30 also runs a mail transceiving software 38 and transmits an e-mail to the effect that a secondary diagnosis request has been received to a terminal computer 31 associated with an expert relevant to the secondary diagnosis in the diagnoser's unit (subsystem) 13. The secondary diagnosis includes detailed analysis of plant data and judgement based thereon which cannot be achieved by the primary diagnosis, so that input data to the secondary diagnosis software 36 has to be prepared by the expert performing the secondary diagnosis at the diagnoser's unit 13.

On the other hand, the expert at the diagnoser's unit 13 having received the e-mail informing the receipt of the secondary diagnosis request by means of a mail-transceiving software in the application software 34, runs a general-purpose web browser and sends a demand to the diagnosis computer 30 by inputting address (URL) for receiving data for a secondary diagnosis window to be displayed on the monitor 32 of the terminal computer 31 including the primary diagnosis input data and diagnosis result data attached to the e-mail from the diagnosis computer 30. Incidentally, the expert can be composed of a group of experts specialized in different fields.

On receiving the demand from the expert, the diagnosis computer 30 prepares the data for a secondary diagnosis questionnaire menu window including the primary diagnosis input data and the primary diagnosis result data, and transmits the data to the terminal computer 31 associated with the expert in charge of the secondary diagnosis. The secondary diagnosis questionnaire menu window 55 (FIG. 6) additionally includes question items for performing secondary diagnosis and an address of a data base stored in the diagnosis computer 30 including plant data necessary for the expert to answer to the question items and supplied from the plant data collecting and processing computer 18. The plant data necessary for the secondary diagnosis and stored in the diagnosis computer 30 can include plant and plant machinery data possessed by the plant maker (which can also be the diagnoser organization) in addition to the plant data (including state variables) supplied from the plant data collecting and processing computer 18.

On receiving the transmission from the diagnosis computer 30, the terminal computer 31 of the expert in charge displays the secondary diagnosis questionnaire menu window 55 on its monitor 32 and waits for inputting by the expert. In order to prepare answers to the question items for the secondary diagnosis, the experts refers to the attached address showing the location of the plant data in the data base and demands a transmission of the data to the diagnosis computer 30. After receiving the plant data in the terminal computer 31, the expert inputs answer data in the secondary diagnosis questionnaire window 55 and sends a demand of secondary diagnosis to the diagnosis computer 30 by clicking a button of "CONFIRM DATA" in the window 55 (FIG. 6). On receiving the demand of secondary diagnosis, the diagnosis computer 30 runs the secondary diagnosis software 36 to execute the secondary diagnosis. The secondary diagnosis results by the diagnosis computer 30 are once returned to the expert having demanded the secondary diagnosis and finally judged by the expert.

Having received the secondary diagnosis results, the expert judges whether the diagnosis results are appropriate as an answer to the user's unit 12, and if yes, prepares an answer document to the user's unit 12 by using document preparation software and/or table calculation software in the application software 34 installed in the terminal computer 31.

However, in case where the diagnosis results prepared by the secondary diagnosis software 36 of the diagnosis computer 30 are judged by the expert to be not a sufficient answer to the diagnosis request from the user, the expert relies on an analysis software other than the secondary diagnosis software and/or a conference with other diagnosis experts to scrutinize and elaborate an answer, and prepares a final answer document by using the terminal computer 31.

The thus-prepared answer document is likely to include a technically highly sophisticated content and a simple review thereof may not provide a sufficient explanation to the diagnosis requester at the user's unit 12 in some cases. In such a case or a case requiring a quick answer or an interrogatory process between the parties, it is appropriate to have an on-line conference with the diagnosis requester at the user's unit 12 by using the TV conference support system 24 via the telecommunication network 14.

In the on-line conference, the answer document prepared by the expert is displayed on the terminal computer 31 of the expert and its monitor picture (window) is commonly held on the terminal computer 20 in the user's unit 12. As a result, the diagnosis requester can hear an explanation by the expert while they are viewing the same picture, so that the explanation can be readily understood, and questions and answers regarding the abnormality can be made based on the same picture to allow a quick and accurate counterstep to be taken.

A final answer document is transmitted from the terminal computer 31 of the expert in charge at the diagnoser's unit 13 to the diagnosis computer 30 as a piece of secondary diagnosis result data. The secondary diagnosis result data including (the answer document, the answers to the secondary diagnosis questionnaire, time required for the diagnosis, a diagnosis level, etc.) transmitted to the diagnosis computer 30 is stored in the data base of the diagnosis computer 30.

Based on the stored secondary diagnosis result data, the diagnosis computer 30 calculates a service charge for each user ID, each terminal computer 20 at the user's unit 12, each user's unit 12, or each user organization having a plurality of such user's unit 12, or determines a discount of the service charge. The discounting function assigned to the diagnosis computer 30 makes the system more user-friendly.

In the plant diagnosis system 10, each user's unit can make a diagnosis request by a terminal computer which may be an ordinary personal computer, and thus need not include a diagnosis computer together with its terminal as in the conventional system. As a result, the problem of the computer installation space can be alleviated. Further, the system introduction cost and the system maintenance cost can be remarkably reduced compared with those of the conventional system since the costs include only the cost for the ordinary personal computer and the cost concerning the utilization of the primary diagnosis software 35 and the secondary software 36.

Further, in the plant diagnosis system 10, a terminal computer 20 or 31 may be disposed at each user's unit 12 or for each expert at the diagnoser's unit, so that the state of utilization of the plant diagnosis system 10 by each user's unit or each expert can be easily administered.

Further, each terminal computer (personal computer) can run another application software and therefore can be in charge of a variety of applications, e.g., by including an order administration software capable of system utilization data for the plant diagnosis system 10.

On the other hand, in the plant diagnosis system 10, the diagnoser's unit 13 can provide a variety of services for each user's unit 12 or for each expert. For example, machinery or parts requiring maintenance work may be specified based on the diagnosis result data, the service charges may be demanded later and inclusively for a plurality of diagnosis services, and the service charge setting may be revised or a new service may be provided for each user's unit in view of the number of utilization, the level of diagnosis, etc.

For secondary diagnosis of an objective plant or machinery thereof in the plant diagnosis system 10, an expert or a group of experts relevant to a particular secondary diagnosis can be selected and specified from a large number of experts. By specifying the fields of specialty of the experts, it becomes possible to provide a further accurate and reliable diagnosis service to each user's unit 12.

Each user's unit 12 or each diagnosis requester (user) at the user's unit 12 is only required to register and memorize its user ID and password, and an individual person thereof need not be concerned with a payment for each service, so that the plant diagnosis system can be utilized at a high level of convenience and at a high reliability.

As described above, according to the plant diagnosis method and system of the present invention, it is possible for a user to repetitively perform a primary diagnosis of objective plant or machinery thereof while confirming the result of the primary diagnosis, so that the system can economize the plant diagnosis cost and is therefore user-friendly.

Further, even in the case of requiring a further detailed diagnosis of an objective plant or machinery thereof, the user can request a further detailed secondary diagnosis on its initiative. The secondary diagnosis is performed by incorporating an expert's judgement and is therefor effected quickly and accurately. Thus, each user (organization or unit therein) can enjoy a variety of diagnosis services inexpensively by utilizing a primary diagnosis alone or in combination with a secondary diagnosis on its initiative.

What is claimed is:

1. A plant diagnosis method, comprising steps to be executed by a diagnosis computer in a diagnoser's unit, including:
   a step of accepting a primary diagnosis request inputted from a terminal in a user's unit,
   a step of issuing a questionaire for urging the user to input necessary data for a primary diagnosis including characteristic symptoms of abnormality of an objective plant or machinery thereof, on accepting the primary diagnosis request,
   a step of executing a primary diagnosis of the objective plant or machinery thereof based on the necessary data inputted by the user and optionally plant data sampled by a plant data collecting and processing means in the plant, to issue a primary diagnosis report,
   wherein the primary diagnosis includes a primary diagnosis result indicating a possible cause of abnormality and means for allowing the user to select a repetition of the primary diagnosis as an alternative to means for requesting a secondary detailed diagnosis.

2. A plant diagnosis method according to claim 1, further comprising steps to be executed by the diagnosis computer in the diagnoser's unit, including:
   a step of accepting a secondary diagnosis request inputted from the terminal in the user's unit having received the primary diagnosis result,
   a step of accepting the secondary diagnosis request and a step of notifying an expert at the diagnoser's unit of the secondary diagnosis request,
   a step of accepting data collected by the expert, and
   a step of executing a secondary diagnosis of the objective plant or machinery thereof based on the data collected by the expert to prepare a result of the secondary diagnosis.

3. A plant diagnosis method according to claim 2, further comprising:
   a step of transmitting the secondary diagnosis result prepared by the secondary diagnosis to a terminal for the expert to have the expert make a final judgment, and
   a step of transmitting an answer of the secondary diagnosis result based on the expert's final judgment to the terminal in the user's unit directly or via the diagnosis computer through a network.

4. A plant diagnosis method according to claim 2, wherein said plant data or the data collected by the expert is obtained from a plant data-collecting and -processing computer storing state variables of the objective plant or machinery thereof.

5. A plant diagnosis system, comprising a diagnoser's unit including:
   means for accepting a primary diagnosis request from a terminal in a user's unit via a network,
   means for issuing a questionaire for urging the user to input necessary data for a primary diagnosis including characteristic symptoms of abnormality of an objective plant or machinery thereof,
   means for executing a primary diagnosis of the objective plant or machinery thereof based on the necessary data inputted by the user and optionally plant data sampled by a plant data collecting and processing means in the plant, to issue a primary diagnosis report,
   wherein the primary diagnosis report includes a primary diagnosis result indicating a possible cause of abnormality and means for allowing the user to select a repetition of the primary diagnosis as an alternative to means for requesting a secondary detailed diagnosis.

6. A plant diagnosis system according to claim 5, further including:
   means for accepting a secondary diagnosis request inputted from the terminal in the user's unit having received the primary diagnosis result,
   means for accepting the secondary diagnosis request and notifying an expert at a diagnoser's unit of the secondary diagnosis request,
   means for accepting data collected by the expert, and
   means for executing a secondary diagnosis of the objective plant or machinery thereof based on the data collected by the expert.

7. A plant diagnosis system according to claim 6, further including:
   means for transmitting the secondary diagnosis result to a terminal for the expert to have the expert make a final judgment, and
   means for transmitting an answer of the secondary diagnosis result based on the expert's final judgment to the terminal in the user's unit via a network.

8. A plant diagnosis system according to claim 6, wherein said plant data or data collected by the expert is obtained from a plant data-collecting and -processing computer storing state variables of the objective plant or machinery thereof.

9. A plant diagnosis system according to claim 5, further including means for presenting abnormalities having occurred in the past at the objective plant or machinery thereof.

10. A plant diagnosis system according to claim 5, wherein the terminal in the diagnoser's unit is connected to the terminal in the user's unit so as to allow people at the terminals have a TV conference including an interrogatory process while commonly viewing an identical picture on monitors of the respective terminals by utilizing a TV conference support system.

11. A plant diagnosis system according to claim 5, further including means for counting the number of primary or/and secondary diagnosis, time of system utilization, or diagnosis time.

12. A plant diagnosis system according to claim 11, further including means for calculating service charges based on a result of the counting.

13. A plant diagnosis system, including:

a diagnoser's sub-system, a user's sub-system and a network connecting the diagnoser's sub-system, a plant system including plant machinery and sensors for detecting physical state variables of the plant machinery thereof, and a network connecting the diagnoser's sub-system with the user's sub-system and the plant system, said user's sub-system comprising a terminal for communication with the diagnoser's sub-system via the network, said diagnoser's sub-system comprising a diagnosis computer and a terminal for an expert;

wherein said diagnosis computer comprises:

means for accepting a primary diagnosis request from a terminal in a user's unit via the network, means for issuing a questionaire for urging the user to input the necessary data for a primary diagnosis including characteristic symptoms of abnormality of an objective plant or machinery thereof, means for executing a primary diagnosis of the objective plant or machinery thereof based on the necessary data inputted by the user and optionally plant data sampled by a plant data collecting and processing means in the plant, to issue a primary diagnosis report, wherein the primary diagnosis report includes a primary diagnosis result indicating a possible cause of abnormality and means for allowing the user to select a repetition of the primary diagnosis as an alternative to means for requesting a secondary detailed diagnosis.

14. A plant diagnosis system according to claim 13, wherein the diagnosis computer further includes:

means for accepting a secondary diagnosis request inputted from the terminal in the user's unit having received the primary diagnosis result, means for accepting the secondary diagnosis request and notifying an expert at a diagnoser's unit of the secondary diagnosis request, means for accepting data collected by the expert, and means for executing a secondary diagnosis of the objective plant or machinery thereof based on the data collected by the expert.

* * * * *